United States Patent [19]

Funke

[11] Patent Number: 4,903,338

[45] Date of Patent: Feb. 20, 1990

[54] OPTICAL INTERFACE

[75] Inventor: Klaus E. Funke, San Rafael, Calif.

[73] Assignee: AMP Incorporated, Harrisburg, Pa.

[21] Appl. No.: 368,134

[22] Filed: Jun. 16, 1989

Related U.S. Application Data

[63] Continuation of Ser. No. 931,578, Nov. 17, 1986, abandoned.

[51] Int. Cl.$^4$ ............................................. H04B 9/00
[52] U.S. Cl. .................................. 455/607; 455/608; 455/619
[58] Field of Search ............... 455/600, 606, 607, 608, 455/616, 617, 612

[56] References Cited

U.S. PATENT DOCUMENTS

| | | | |
|---|---|---|---|
| 4,241,455 | 12/1980 | Eibner | 455/600 |
| 4,330,870 | 5/1982 | Arends | 455/619 |
| 4,388,732 | 6/1983 | Hansel | 455/608 |
| 4,408,325 | 10/1983 | Grover | 370/11 |
| 4,410,878 | 10/1983 | Stach | 340/347 DD |
| 4,665,531 | 5/1987 | Aly | 375/17 |
| 4,694,504 | 9/1987 | Porter | 455/619 |

OTHER PUBLICATIONS

Data Sheet, National Semiconductor Corp., DP8464B Disk Pulse Detector, (1985), pp. 1–20.
Wile et al., "Pulse Detector Chip Keeps Hard-Disk Drives Virtually Error-Free," Electronic Design, (Aug. 8, 1985), pp. 121–128.
Electronic Engineer, vol. 50, No. 611, Sep. 1978, pp. 81–85.
Electronic Optical System Design, vol. 13, No. 12, Dec. 1981, pp. 33–35.
Telecom Reports Siemens, vol. 2, "Beiheft", vol. 2, 1979, pp. 155–159.
National Semiconductor, DP8464B, Disk Pulse Detector Specification, 8–85.

Primary Examiner—Robert L. Griffin
Assistant Examiner—L. Van Beek
Attorney, Agent, or Firm—David L. Smith

[57] ABSTRACT

An optical interface which is adapted for use in a local area network is provided. The optical interface comprises an optical transmitter section and an optical receiver section. The optical transmitter section receives data in a non-return to zero inverted (NRZI) format from a LAN controller which the optical interface is part of a remote node. The optical transmitter section converts the non-return to zero inverted data to an alternate mark insertion (AMI) format. An LED driver circuit smooths out and extends the alternate mark insertion data and uses it to drive an LED. The LED driver alternately drives the LED from a fifty percent reference output level to zero percent output and one hundred percent output corresponding to alternate positive-going and negative-going transition of the data. The optical receiver section has a light sensitive detector and preamplifier which receives optical signals encoded with digital data and generates corresponding electrical signals. The electrical signals are processed by a peak pulse detector which is preferably a disk detector of the type used to detect signals generated by the read/write heads of magnetic disk media. The disk pulse detector generates unipolar digital signals corresponding to the AMI signals. A decoder converts the unipolar digital pulses to NRZI format. The NRZI data is communicated to a LAN controller when the optical receiver is part of a remote optical interface and to conventional LAN hub circuitry when it is part of a hub optical interface. The LED driver circuit comprises the entire transmitter section of a hub optical interface and receives data for transmission directly from the hub LAN circuitry.

28 Claims, 4 Drawing Sheets

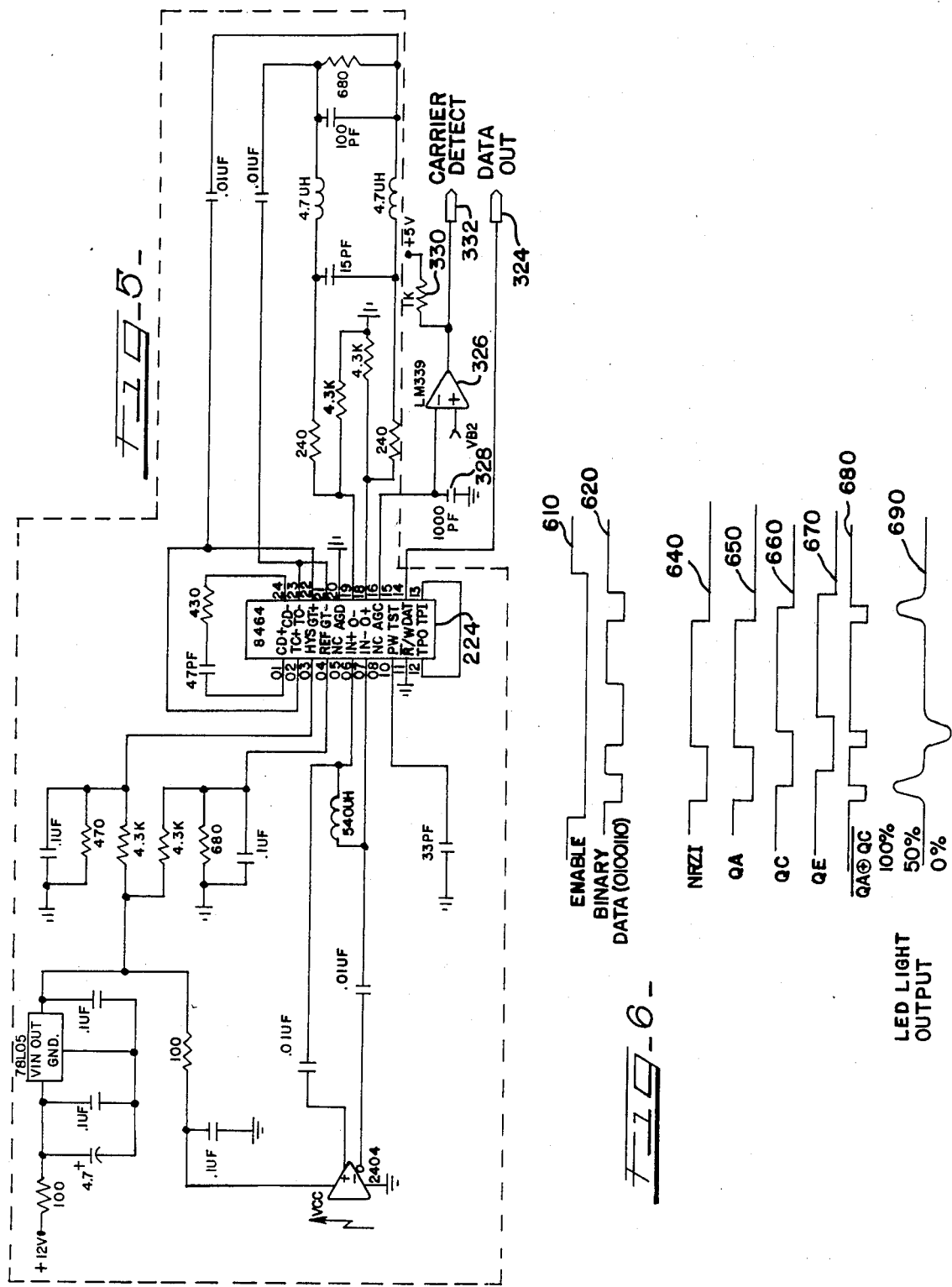

OPTICAL INTERFACE

This application is a Continuation of Application Ser. No. 931,578 filed Nov. 17, 1986, now abandoned.

BACKGROUND OF THE INVENTION

1. Field of the Invention

This invention relates generally to interface circuits. More particularly, it relates to an optical interface which has improved transmitter and receiver circuitry that provides improved performance, reduces transmission errors due to timing jitter, that provides improved noise immunity and is suitable for use with low level signals, and that is particularly well suited for use in multi-tier local area networks.

2. Description of the Related Art

At present, two primary technologies are employed in applications requiring the local transmission of data: conventional hardwire technology and relatively new fiber optic technology. With hardwire technology, data is normally transmitted in the form of RF modulated data signals. The primary advantage of hardwire technology is that it can be used over relatively long distances with acceptable signal loss. Improved fiber optic cables are also providing increased distance and reduced signal loss in the fiber optic technology.

In addition, fiber optic technology has certain advantages over hardwire technology that make it desirable in many applications. For example, the fiber optic technology is not affected by certain types of electrical and magnetic interference that affect hardwire communications. Also, fiber optic technology provides increased security since, unlike the signal on a hardwire cable, the signal on a fiber optic cable cannot be tapped off or diverted between the data transmitting source and the receiver without the interception being recognized at the receiver.

One problem that has affected both hardwire and fiber optic technology in some applications, for example multi-tier local area networks, is susceptibility to transmission errors due to timing jitter caused by the repeated reception and re-transmission of data signals. In large multi-tier networks with many nodes, such timing jitter results in inordinate numbers of transmission errors which may increase the average transmission time and hence adversely affect the efficiency and throughput of the network. In severe cases, the loss of efficiency may be so great as to perhaps even render the desired application impracticable.

In the past, it has been suggested to buffer the received data or to employ phase locked loop receivers in order to overcome the effects of timing jitter. However, these approaches have not proved entirely satisfactory. The buffer approach limits the capacity and speed of transmissions because the buffers obviously have finite length and because additional time is required to read out the received data. The phase locked loop approach also limits the efficiency of the network, and particularly high speed networks, because it requires a relatively long time to lock on to the input data signal. Accordingly, an undesirably long preamble or locking signal is typically required to precede the actual data signals.

In applications where signals are transmitted at relatively low levels, noise interference has also been a problem. Typical receiver circuits have employed pulse detectors that detect predetermined signal threshold or zero crossings. Such receivers may not provide adequate noise immunity where low level signals are to be transmitted in a noisy environment.

In view of the foregoing, it is an object of the present invention to provide an improved optical interface that provides improved performance and noise immunity, that decreases the occurrence of transmission errors due to timing jitter, and that exhibits none of the aforementioned drawbacks of the prior art approaches.

More particularly, it is an object of the invention to provide such an interface that is particularly suited for use in applications involving the local transmission of data, such as local area networking.

SUMMARY OF THE INVENTION

The foregoing objects and attendant advantages are achieved by providing an optical receiver having a light sensitive receiver that receives optical signals encoded with digital data and produces corresponding electrical signals, and a peak pulse detector that detects the digital data in the electrical signals and generates digital data signals therefrom.

Also provided is an optical transmitter that receives digital data signals and has a converter that generates bipolar alternate mark insertion pulses corresponding to state transitions thereof. The optical transmitter also has an optical source for generating optical signals and an optical source driver that maintains the optical source output at a reference level comprising a percentage of full optical output and that drives the optical source between the reference and full or zero output in response to the pulses to generate alternate mark insertion optical signals that correspond to the pulses.

An optical interface having both an optical receiver and an optical transmitter of the type described is also provided, as well as a local area network incorporating such an interface.

BRIEF DESCRIPTION OF THE DRAWING

The novel features which are believed to be characteristic of the invention are set forth in the appended claims. The invention itself will be best understood by reference to the detailed description of a presently preferred embodiment thereof set forth below, in conjunction with the drawing, in which:

FIG. 5 is an electrical schematic diagram illustrating the details of a preferred optical receiver comprising a portion of the optical interface associated with the local area network hubs illustrated in FIGS. 1 and 2; and FIG. 6 is a timing diagram illustrating the relative timing of the various signals present in the preferred optical transmitter.

DESCRIPTION OF THE PREFERRED EMBODIMENT

The detailed description of a presently preferred embodiment of the optical interface of the invention is set forth below with reference to a particular application thereof in a local area network. However, it is to be understood that the optical interface of the invention is by no means limited to this type of application and will find use in many other applications requiring local data transmission as well, including, for example, remote data logging, local communications, and others.

Figure 1:
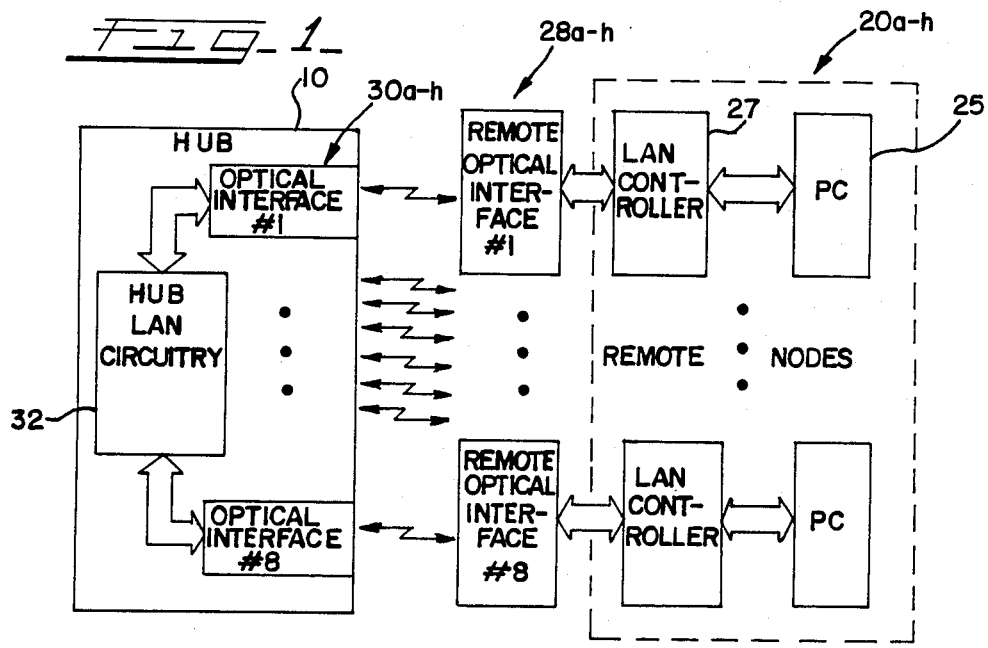
FIG. 1 is a block diagram illustrating the preferred optical interface of the invention in a conventional single tier local area network.

With this understanding, and having reference to the drawing, FIG. 1 illustrates generally a one-tier local area network in which remote optical interfaces 28a–h of the invention interface eight remote nodes 20a–h to a hub 10. Each remote node may be a conventional personal computer (PC) 25 such as an IBM Personal Computer interfaced with a conventional local area network (LAN) controller 27 such as an Intel 82588 LAN Controller. The selection, interfacing, and operation of the components comprising the remote nodes are well known to those skilled in the art and are not in themselves novel aspects of the invention. They are referred to here generally, however, as background for the invention.

The hub 10 contains eight optical interfaces 30a–h corresponding to the eight remote optical interfaces 28a–h. Each hub optical interface 30a–h and each remote optical interface 28a–h has an optical receiver section and an optical transmitter section which are described in detail below. The hub 10 also has conventional hub LAN circuitry 32 that is electrically connected bidirectionally to each hub optical interface 30a–h. The hub LAN circuitry 32 processes the data signals received by the optical receiver sections of the optical interfaces 30a–h and provides the data signals to the optical transmitter sections of the optical interfaces 30a–h for re-transmission over the network both in a manner well known to those skilled in the art. For example, the hub LAN circuitry 32 typically includes a collision detector (not shown) that detects if signals are received through more than one optical interface 30a–h simultaneously; a jamming signal generator (not shown) that generates a jamming signal to each node when a collision is detected; and pulse regenerator or repeater circuits (not shown) that echo the data signals received from a node through one optical interface to all other nodes through the remaining optical interfaces. Similarly to the remote node components referred to above, the hub LAN circuitry 32 is conventional circuitry that is known to those skilled in the art. It is not in itself a novel aspect of the invention but is referred to generally here as background for the invention.

Figure 2:
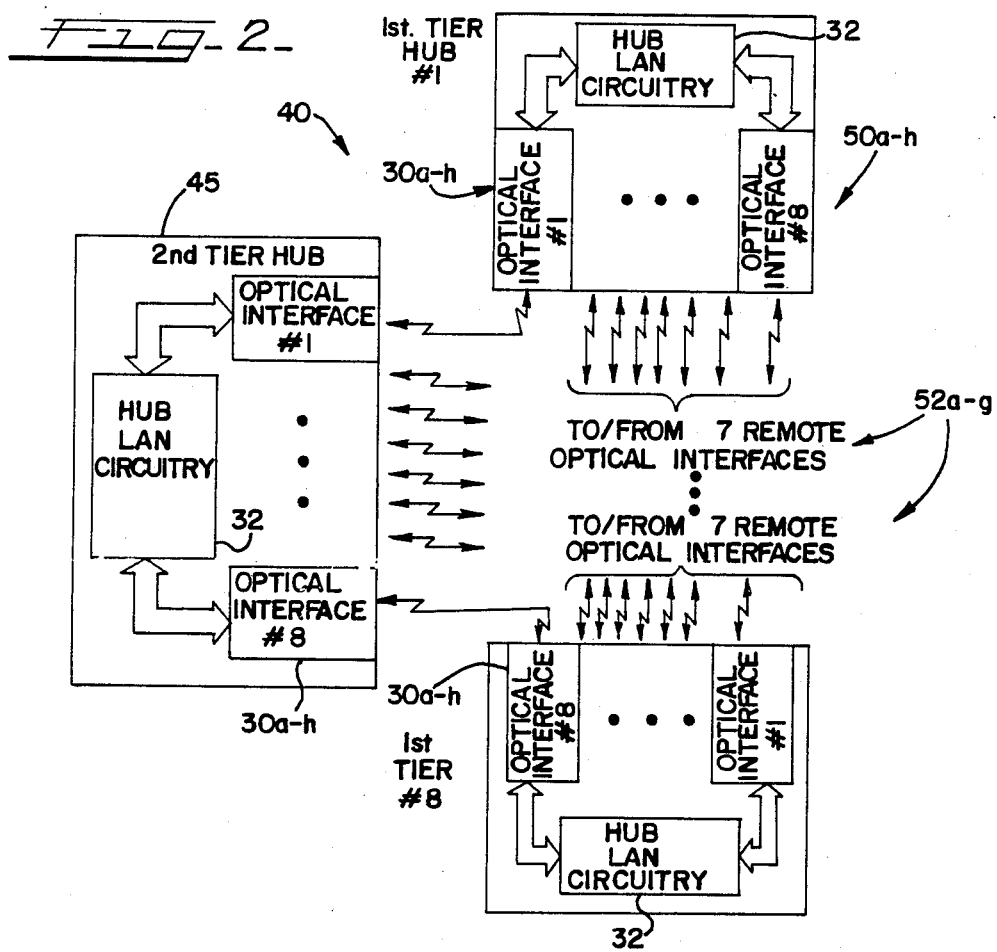
FIG. 2 is a block diagram illustrating the preferred optical interface of the invention in a conventional two-tier local area network.

FIG. 2 illustrates generally a two-tier LAN comprising a second tier hub 45 and eight first tier hubs 50a–h. Each first tier hub 50a–h has eight optical interfaces 30a–h identical to those illustrated in FIG. 1. Each first tier hub 50a–h also has conventional hub LAN circuitry 32 identical with that illustrated in FIG. 1 and electrically connected bidirectionally to the hub optical interfaces 30a–h. Seven optical interfaces of each first tier hub 50a–h interface with seven corresponding remote optical interfaces 52a–g. One optical interface of each first tier hub 50a–h provides a dedicated interface with a corresponding optical interface of the second tier hub 45.

The second tier hub 45 has eight optical interfaces 30a–h identical to those in the first tier hubs 50a–h. Each second tier hub optical interface 30a–h interfaces one first tier hub 50a–h to the second tier hub 45 through the corresponding dedicated optical interface of the first tier hub 50a–h. The second tier hub 45 also includes conventional hub LAN circuitry 32 identical to that illustrated in FIG. 1 and described above.

It will be appreciated that with a two-tier LAN arrangement as shown and described, up to 56 remote nodes can be linked together and communicate. However, it will also be appreciated that with multiple tier LAN configurations, the number of re-transmissions of signals from any one node necessary to communicate the signals to all other nodes in the network is greatly increased. Increased re-transmissions result in increased timing jitter and noise interference that as previously described limit the efficiency and effectiveness of the network. Similar problems may also be encountered in other non-network related local data transmission applications.

The optical interface of the present invention, which will now be described in detail, provides improved communication performance by reducing the effect of timing variations on transmitted and re-transmitted data signals and by providing improved signal receiver circuitry.

Figure 3:
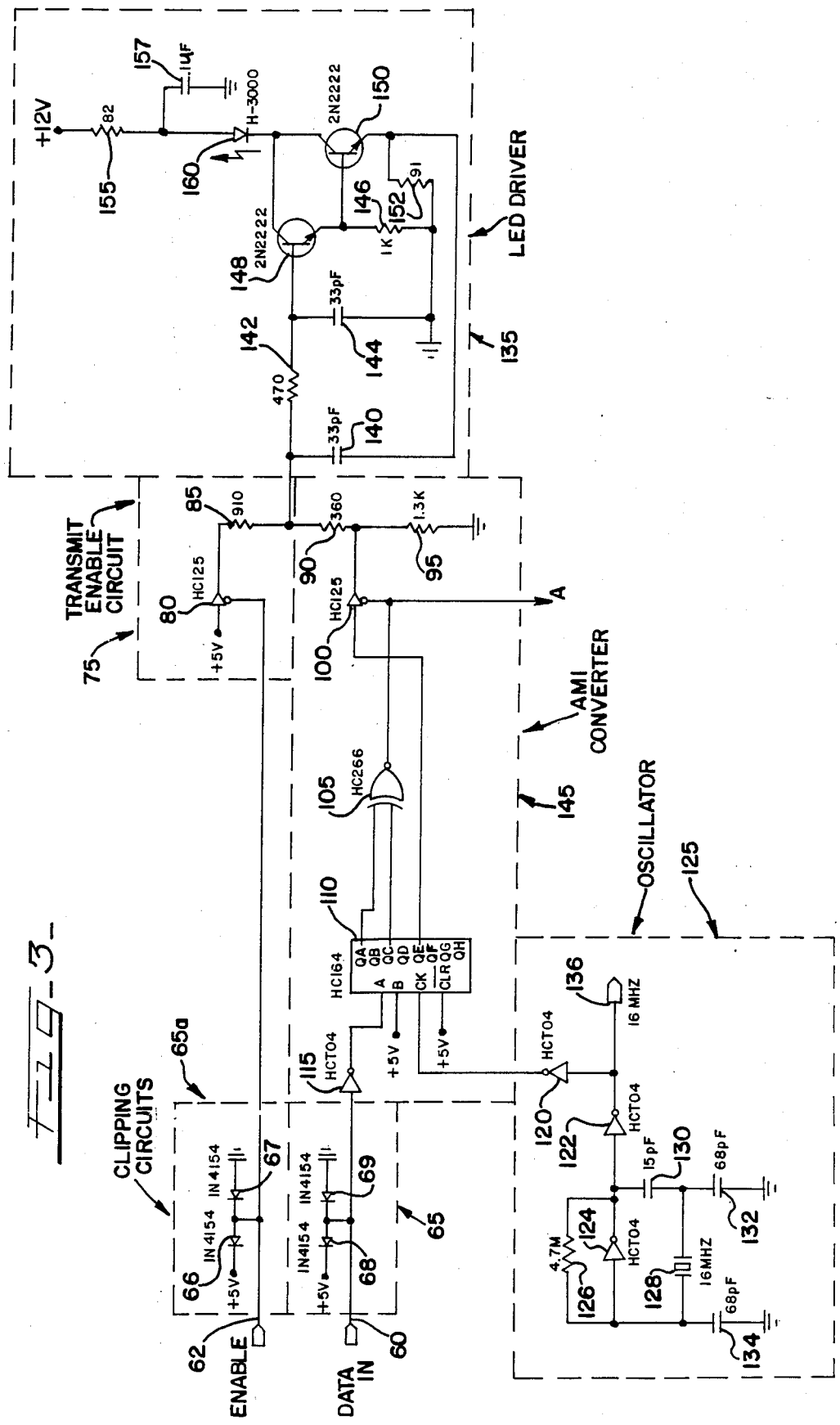
FIG. 3 is an electrical schematic diagram illustrating the details of a preferred optical transmitter circuit comprising a portion of the remote optical interface of FIGS. 1 and 2.

FIG. 3 illustrates the details of a preferred optical transmitter section of the remote optical interfaces 28a–h of FIG. 1. The preferred optical transmitter as illustrated and described below is intended to be interfaced with and to work in conjunction with an Intel 82588 or equivalent LAN controller or other data source that outputs MOS logic level digital data at a 2 megabits per second (mbps) rate in the nonreturn to zero inverted (NRZI) format. Throughout the drawing and following description, preferred components and component values are as illustrated.

The optical transmitter has a DATA IN input 60 on which digital data is received and an ENABLE input 62 on which a transmit enable signal is received. With reference to the terminology used by the Intel 82588 LAN controller, the DATA IN input 60 is also referred to as the TXD input and the ENABLE input 62 is also referred to as the RTS input.

The signals on the DATA IN and ENABLE inputs 60 and 62 respectively are input to identical clipping circuits 65 and 65a respectively comprised of parallel diode pairs 68, 69 and 66, 67 respectively. Diodes 66 and 68 have anodes connected to a +5V source and cathodes connected to the ENABLE and DATA IN inputs 62 and 60 respectively. The diodes 67 and 69 have cathodes connected to GND and anodes connected to the ENABLE and DATA IN inputs 62 and 60 respectively. The clipping circuits 65 and 65a protect the optical transmitter circuitry against input signals having excessively high levels by clamping the input voltage on the ENABLE and DATA IN inputs between approximately zero and five volts.

The ENABLE input 62 is also connected to the control terminal of a tri-state buffer 80, which together with a +5V source and a resistor 85 comprises a transmit enable circuit 75. The input terminal of the buffer 80 is connected to the +5V source and the output is connected to GND through a resistor bias network comprised of the resistor 85 in series with resistors 90 and 95. When data is to be transmitted by the optical transmitter, a low logic level signal is placed on the EN- ABLE input 62 to activate the buffer 80. The resulting +5V output of the buffer 80 then enables the LED driver circuit 135 which is described in detail below. When the signal on the ENABLE input 162 is high, the buffer 80 is in its high impedance state and the LED driver circuit 135 is disabled.

The DATA IN input 60 is connected to the input of an alternate mark insertion (AMI) converter 145 comprising an inverter 115, eight stage shift register 110, exclusive NOR (XNOR) gate 105, tri-state buffer 100, and resistors 90 and 95. The DATA IN input 60 is connected to the "A" signal input of the shift register 110 through the inverter 115. The QA and QC outputs of the shift register 110 are connected to inputs of the XNOR gate 105. The output of the XNOR gate 105 is connected to the control terminal of the tri-state buffer 100 and the QE output of shift register 110 is connected to the input of the buffer 100. The output of the buffer 100 is connected to the junction of the series resistors 90 and 95.

The AMI converter 145 converts the NRZI format data signals to an alternate mark insertion format in which alternating polarity pulses mark the positive and negative-going transitions of the original NRZI data stream. As a result, the original stream of data bits, which is dependent on proper timing to maintain the integrity of the data and which is thus susceptible to transmission error due to timing jitter, is replaced with a data stream having pulses that mark and identify only the transitions of the original data stream and which is not sensitive to timing variations.

The shift register 110 has a clock input connected to the output of an oscillator 125 which generates a 16 MHz clock signal. The oscillator 125 has a crystal 128 capable of oscillating at 16 MHz. The first and second terminals of the crystal 128 are connected to ground through capacitors 134 and 132 respectively. The first terminal of the crystal 128 is also connected to the input of an inverter 124 and the second terminal is connected to the output of the inverter 124 through a capacitor 130. A resistor 126 connects the output and input of the inverter 124. The output of the inverter 124 is connected through two series inverters 122 and 120 to the clock input of the shift register 110. The inverter 122 is preferably of a type that converts the 16 MHz HCMOS level clock signals to MOS level. The output 136 of the inverter 122 is connected to the LAN controller or other data source (not shown) on a 16 MHz clock output 136.

The NRZI data entering the shift register 110 on input "A" is transmitted at a 2 mbps rate. Accordingly, each data bit corresponds to 8 cycles of the 16 MHz clock signal. Referring to FIG. 6, the signals 660 and 670 at the outputs QC and QE of the shift register 110 are shifted with respect to the signal 650 at output QA by two and four clock pulse widths respectively. The XNOR gate 105 produces a two clock pulse wide negative-going pulse 680 for each state transition of the NRZI signal 650 on the output QA. It should be noted here that since the signal 650 on the output QA is an NRZI format signal, each positive and negative state transition of this signal corresponds to a negative-going transition in the binary encoded signal represented thereby. The logic level of the QE signal 670 at each state transition of the QA signal 650 alternates, first high, then low, then high, and so on. The negative-going output signals 680 of the XNOR gate 105 activate the tri-state buffer 100 for a duration of two clock pulses each state transition of the signal 650 on output QA. During this time, the output of the buffer is either high or low as determined by the state of the signal 670 on output QE.

The output of the tri-state buffer 100 is connected to the resistor bias network comprised of series resistors 85, 90 and 95 at the junction of resistors 90 and 95. The alternating output of the buffer 100 produces a bipolar alternate mark insertion signal corresponding to the pulses at the output of the buffer at the junction of resistors 85 and 90. When the tri-state buffer 80 is active and the tri-state buffer 100 is inactive, this signal is at a reference level of about 2.75 volts which corresponds to an LED 160 output of approximately 50%. When the buffer 100 is active and its output goes low, the signal drops to about 1.2 volts which corresponds to an LED 160 output of 0%. When the buffer 100 is active and its output goes high, the signal rises to approximately 5 volts which corresponds to an LED 160 output of approximately 100%.

The alternate mark insertion signal at the junction of resistors 85 and 90 is input to the LED driver circuit 135 as the output drive signal. The LED driver circuit 135 amplifies and low pass filters this signal. The rate of rise and fall of the optical output signal 690 is thereby smoothed and somewhat extended with respect to the digital signals output by the buffer 100 as illustrated in FIG. 6. This smoothing and extending of the edges of the optical output signal further reduces the effects of timing jitter and the possibility of transmission error. By maintaining the drive signal at a reference level preferably corresponding to an LED 160 illumination of approximately 50% and swinging the LED output between 50-100% and 50-0%, the LED can be modulated at a higher rate and data can be transmitted at a higher rate thereby increasing the transmission bandwidth.

The LED driver circuit 135 comprises an amplifier comprised of NPN transistors 148 and 150, and resistors 146, 152, and 155; and an active low pass filter comprised of capacitors 140 and 144, and resistor 142 acting in conjunction with the amplifier. The emitter of the transistor 148 is connected to the base of the transistor 150 and through the resistor 146 to ground. The collector of the transistor 148 is connected to the collector of the transistor 150, which is connected to the anode of the LED 160. The emitter of the transistor 150 is connected to ground through resistor 152. The cathode of the LED 160 is connected to a +12V source through a current limiting resistor 155 and to ground through a filter capacitor 157. The capacitor 144 connects the base of the transistor 148 to ground. The capacitor 140 connects the emitter of the transistor 150 to the junction of the series bias resistors 85 and 90 and the resistor 142 connects the base of transistor 148 to the same junction.

Figure 4:
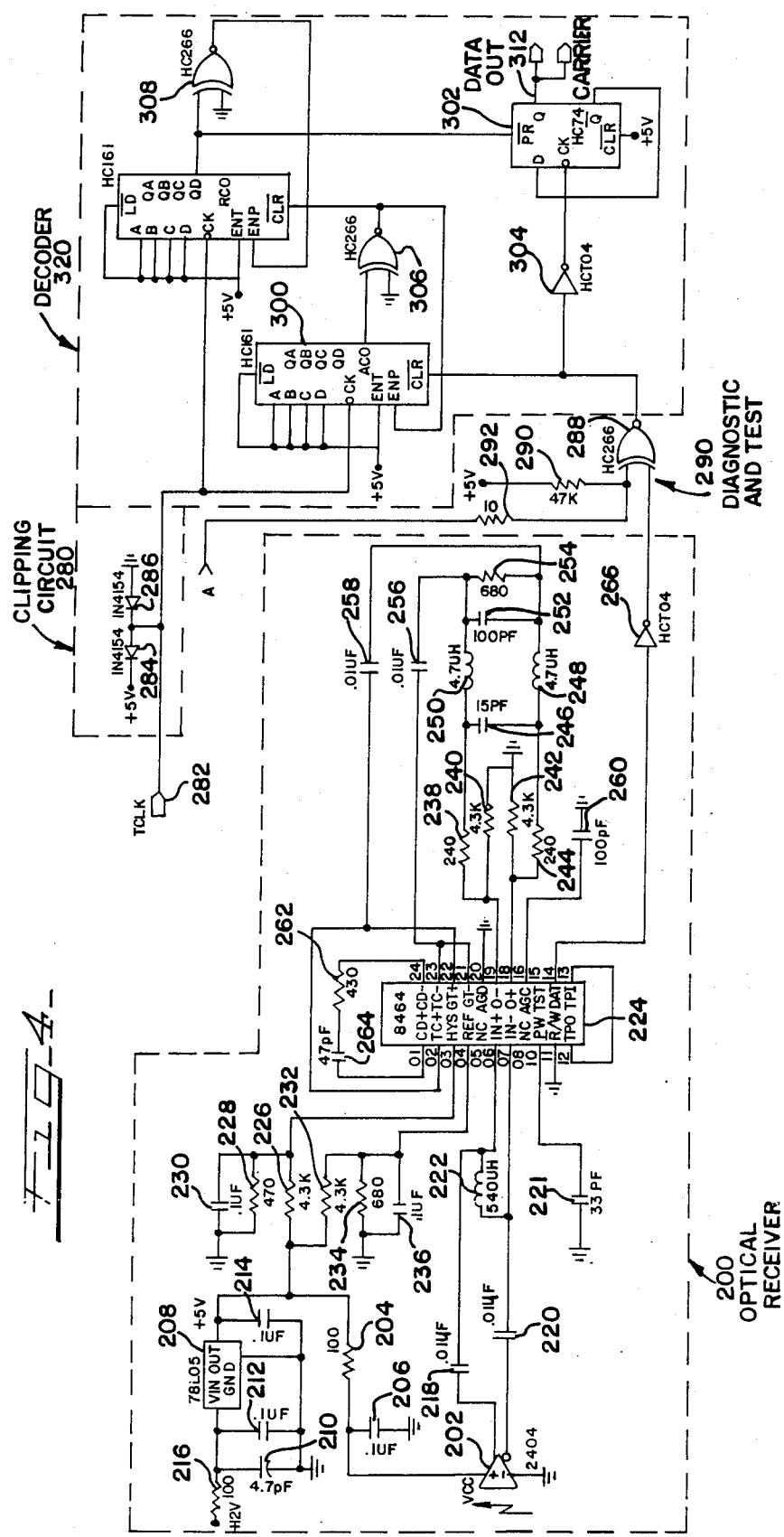
FIG. 4 is an electrical schematic diagram illustrating the details of a preferred optical receiver comprising a portion of the remote optical interface of FIGS. 1 and 2.

FIG. 4 illustrates the details of the preferred optical receiver section of the remote optical interface 28a–h of FIG. 1. The optical receiver illustrated in FIG. 4, like the optical transmitter illustrated in FIG. 3, is intended to be interfaced with an Intel 82588 LAN controller or other circuitry that will receive MOS logic level data in the NRZI format. As illustrated, the preferred optical receiver is configured to receive and decode data in packets having a defined preamble and ending sequence described in detail below.

The optical receiver comprises an optical signal receiver circuit 200 which receives an optical signal transmitted by an optical transmitter such as the one illustrated in FIG. 3, a clipping circuit 280 having an input connected to a clock input TCLK 282 which is connected to the LAN controller or other data receiving circuit (not shown), a diagnostic and test circuit 290 having inputs connected to an output of the optical receiver circuit 200 and to the output of the XNOR gate 105 of the optical transmitter of FIG. 3, and a decoder circuit 320 having inputs connected to the TCLK 282 input and the output of the diagnostic and test circuit 290, and outputs connected to the LAN controller or other data receiving circuitry.

The preferred optical receiver circuit 200 has a light sensitive receiver amplifier 202, such as the 2404 fiber optic detector and preamplifier manufactured by Motorola, which receives the optical signal transmitted by the LED 160 and which produces corresponding electrical signals on its inverted and non-inverted output terminals. The power terminal Vcc of the receiver amplifier 202 is connected to a +5V source through a current limiting resistor 204 and to ground through a filter capacitor 206. The ground terminal of the receiver amplifier 202 is connected directly to GND.

The +5V source is derived from a +12V source by a five volt regulator circuit comprised of a 78L05 five volt regulator 208, and capacitors 210, 212 and 214. The +12V source is connected to the input of the five volt regulator 208 through a resistor 216. The capacitors 210 and 212 are connected in parallel between the five volt regulator input and GND. The output of the five volt regulator 208 produces +5V across capacitor 214, which is connected between the regulator output and GND.

The non-inverting and inverting output terminals of the light sensitive receiver amplifier 202 are connected to positive and negative signal inputs of a peak pulse detector 224 through a low pass filter comprised of capacitors 218 and 220, and inductor 222. Capacitor 218 is connected between the positive output terminal of the amplifier 202 and the positive signal input of the pulse detector 224. Capacitor 220 is connected between the negative terminal of the amplifier 202 and the negative signal input of the pulse detector 224. The inductor 222 is connected directly between the positive and negative signal inputs of the peak pulse detector 224.

A pulse detector comprising a peak pulse detector and a low pass filter is preferred because of the improved noise immunity it provides over conventional detector apparatus, particularly in applications involving low level signals. The peak pulse detector 224 is preferably a DP8464B Disk Pulse Detector manufactured by National Semiconductor Corporation or an equivalent thereof. The preferred DP8464B peak pulse detector is a zero-slope detector. As its name indicates, the DP8464B is designed for use in detecting pulses generated by the read/write heads of magnetic storage disks. The read/write heads of magnetic storage disks typically generate signals in the form of a series of pulses of alternating polarity caused by the detection of flux reversals on the magnetic disk medium which indicate digital data bits. The DP8464B produces unipolar TTL level output pulses having rising edges corresponding to the peaks of the alternating polarity input pulses. The applicant has discovered that this type of pulse detector, which until now was thought applicable only to reading magnetic disks, provides surprisingly excellent detection of AMI formatted signals in communications applications. Accordingly, this type of zero slope peak pulse detector is preferred for use in the optical interface of the invention. It is understood, however, that other types of peak pulse detectors that generate digital pulses corresponding to peaks of received signals may also be used, if desired.

In the presently preferred embodiment of the optical receiver, it has been found suitable to configure the peak pulse detector 224 as described in the National Semiconductor DP8464B Disk Pulse Detector data sheet which is available to those skilled in the art. Accordingly, a set hysteresis reference voltage is established by connecting the +5V source to GND through a bias network comprised of series resistors 226 and 228, and capacitor 230 connected between GND and the junction of resistors 226 and 228. The set hysteresis reference voltage appears at the junction of the series resistors 226 and 228 which is connected to the set hysteresis terminal of the pulse detector 224.

Likewise, an automatic gain control (AGC) reference voltage is established by connecting the +5V source to GND through a bias network comprising series resistors 232 and 234, and capacitor 236 connected between the junction of the resistors 232 and 234 and GND. The reference voltage appears at the junction of the resistors 232 and 234, which is connected to the AGC reference voltage input terminal of the pulse detector 224.

The time pulse out and time pulse in terminals of the pulse detector 224 are tied together. The read/write and analog ground terminals are tied to GND. The positive and negative gain controlled amplifier output terminals are connected to a low pass filter comprised of resistors 238, 240, 242, 244 and 254; capacitors 246, 252, 256 and 258; and inductors 248 and 250. The positive and negative output terminals are connected to ground through resistors 242 and 240 respectively. The positive and negative output terminals are connected to opposite terminals of capacitor 246 by resistors 244 and 238 respectively. The opposite terminals of capacitor 246 are connected to corresponding opposite terminals of the capacitor 252 by the inductors 248 and 250 respectively. The resistor 254 is connected across the terminals of the capacitor 252. The junction of the capacitor 252, inductor 250 and resistor 254 is connected to the negative time channel and gate channel inputs of the pulse detector 224 through the capacitor 256. The junction of the capacitor 252, inductor 248, and resistor 254 is connected to the positive time and gate channel inputs of the pulse detector 224 through the capacitor 258. The differentiator feedback terminals of the pulse detector 224 are connected by a series resistor 262 and capacitor 264. The AGC terminal is connected to ground through a capacitor 260. The preferred DP8464B peak pulse detector includes in a single integrated circuit package a gain controlled amplifier, the gain of which is automatically controlled by an automatic gain control circuit as a function of the rectified level of the amplified, filtered input signals and the value of the automatic gain control reference voltage; a differential comparator having threshold or hysteresis determined by the value of the set hysteresis reference voltage; a differentiator and associated bidirectional one shot; and a D-flip-flop and associated bidirectional one shot. The gain controlled amplifier receives and amplifies the AMI encoded positive and negative signals from the light sensitive receiver amplifier 202. The amplified signals are output at the gain controlled amplifier output terminals and are low pass filtered by the filter comprised of resistors 238, 240, 242, 244, and 254; capacitors 246, 252, 256, and 258; and inductors 248 and 250. The low pass filtered signals are fed in parallel to the inputs of the differential comparator and the differentiator through the time and gate channel inputs respectively. The differentiator is a zero-slope peak detector which outputs 0V at each zero-slope peak of the filtered signals and which changes state at each peak when the signals change direction. Each state change of the differentiator triggers its associated one shot which generates a timing pulse having its rising edge corresponding in time to the detected signal peak. The timing pulse is input to the clock (C) terminal of the D-flip-flop through the time pulse out and time pulse in terminals. The output of the differential comparator is connected to the data terminal (D) of the D-flip-flop. The output of the D-flip-flop triggers its associated one shot when a state change on the data terminal (D) is clocked through. The output of this one shot is the data output terminal of the preferred peak pulse detector. The threshold or hysteresis of the differential comparator ensures that pulses are not erroneously output in response to low-level noise peaks. Thus, only the conjunction of a received signal having level in excess of the differential comparator threshold and the occurrence of a peak in the signal will cause a changed logic level on the D-flip-flop to be clocked through and trigger the one shot to produce an output pulse.

Unipolar TTL level pulses are generated at the data output terminal of the peak pulse detector 224 corresponding to the alternating optical pulses received by the receiver amplifier 202. These TTL level pulses reproduce the original NRZI data stream transmitted by the optical transmitter of FIG. 3. The data output terminal is connected to the input of an inverter 266 which converts the NRZI data stream to HCMOS level.

The output of the inverter 266 is connected to an input of a diagnostic and test circuit 290 which comprises an XNOR gate 288. The other input of the XNOR gate 288 is connected through resistor 292 to a point "A" which corresponds to the output of the XNOR gate 105 illustrated in FIG. 3. The same input of the XNOR gate 288 is connected to a +5V source through a pull-up resistor 290. The output of the XNOR gate 288 is connected to the clear input of a four-bit binary counter 300 and to the clock input of a latch 302 through an inverter 304. The counter 300, latch 302, and inverter 304 are all part of the decoder circuit 320 which is described in detail below.

The diagnostic and test circuit 290 allows a test data stream to be transmitted directly from the output of the XNOR gate 105 of the optical transmitter section of the optical interface to the decoder circuit 320 of the optical receiver section of the optical interface, and to bypass the LED driver circuit 135 and the optical receiver circuit 200. To perform a diagnostic test, the ENABLE input 62 of the optical transmitter is held high so that the LED driver circuit 135 is disabled and there is no optical output. A selected NRZI formatted data stream is then input to the optical transmitter on the DATA IN input 60. The AMI converter circuit 145 converts the data stream into alternate mark insertion pulses as described above and inputs the pulses to one input of the XNOR gate 288. Since no data was transmitted optically, the other input of the XNOR gate 288 is held high by the inverter 266. Thus, if all is functioning properly, the output of the XNOR gate 288 should output the same pulses as were input.

The decoder circuit 320 comprises binary four-bit counters 300 and 310, XNOR gates 306 and 308, inverter 304, and latch 302. The clear terminal of the counter 300 is connected to the output of the XNOR gate 288. The carry out output of the counter 300 is connected to an input of the XNOR gate 306, the other input of which is connected to GND. The output of the XNOR gate 306 is connected to the clear input of the counter 310 and to the count-enable P input of the counter 300.

The clock inputs of the counters 300 and 310 are connected to the clock input TCLK 282 through the clipping circuit 280. The TCLK input 282 is connected to the LAN controller (not shown) and carries a 2 MHz clock signal. The clipping circuit 280, which is comprised of diodes 284 and 286 arranged as described above with respect to clipping circuits 65 and 65a, protects the optical receiver circuitry against signals on the TCLK input 282 having excessively high levels.

The QD output of the counter 310 is connected to an input of the XNOR gate 308, the other input of which is tied to GND. The output of the XNOR gate 308 is connected to the count-enable P input of the counter 310. The count-enable N inputs of both counters are tied to a +5V source. The QD output of the counter 310 is also connected to the preset input of the latch 302. The Q output of the latch 302 is connected to a DATA OUT output 312 on which the decoded NRZI data stream is output. In the terminology of the Intel 82588 LAN Controller, the DATA OUT output 312 is also referred to as the RXD output. The /Q (inverted Q) output of the latch 302 is connected directly to the data input terminal D of the latch.

In the preferred embodiment of the optical interface illustrated in FIGS. 3 and 4 and described above, data is transmitted and received in packets. Each packet of valid data is preceded by a preamble which in the preferred embodiment is a maximum of eight 2 MHz clock cycles in duration. A packet ends with fifteen clock cycles of no state transitions in the data stream.

The counter 300 of the decoder circuit 320 counts the fifteen clock cycles during which no transitions occur and the counter 310 counts the eight clock cycles corresponding to the preamble. Each occurrence of a negative-going transition in the data stream causes the output of the XNOR gate 288 to go low and resets the counter 300. However, if no transition occurs for fifteen cycles of the 2 MHz clock signal on the TCLK 282 input, the carry out output of the counter 300 goes high. This drives the output of the XNOR gate 306 low disabling the counter 300 from further counting and clearing the counter 310. The next negative-going transition in the data stream, which is assumed to be the first pulse in the preamble of the next data packet, causes the output of the XNOR gate 288 to go low, which clears the counter 300 and causes its carry out output to go low, thereby re-enabling the counters 300 and 310 to count. Thereafter, the counter 310 counts cycles of the clock on the TCLK input 282. On the seventh cycle, the QD output of the counter 310 goes high driving the output of the XNOR gate 308 low and disabling the counter 310 from further counting. At the same time, the high state on the QD output releases the low signal on the latch 302 preset terminal thereby enabling the latch 302 to decode the data stream output by the XNOR gate 288 into NRZI format and to pass the decoded data stream through to the DATA OUT line 312.

The data stream output by the XNOR gate 288 is inverted by the inverter 304 and is applied to the clock terminal of the latch 302 which in the preferred embodiment is of a type that is clocked by negative-going transitions. Thus, each positive-going transition of the data stream clocks the latch 302. Since the /Q output of the latch 302 is connected directly to the data input D, the first positive-going transition clocks through a logic low state, the next positive-going transition clocks through a logic high, and so on. The resulting NRZI formatted data stream on the DATA OUT line 312 is input to the LAN controller or other data receiving circuitry (not shown).

As described previously, each of the hub optical interfaces 30a-h also includes an optical transmitter and an optical receiver section. The optical transmitter section of each hub optical interface 30a-h is identical to the LED driver circuit 135 of the optical transmitter of the remote optical interface 28a-h illustrated in FIG. 3. Data received in the hub in the AMI format by a hub optical receiver is input directly to the hub optical transmitters by the hub LAN circuitry 32 and is echoed to all nodes connected to the hub.

The hub optical receiver is, with minor deviations, essentially the same as the optical receiver of the remote optical interface which is illustrated in FIG. 4 and described above. FIG. 5 illustrates a preferred embodiment of a hub optical receiver. The portion of the circuit illustrated within dotted lines is in construction and operation identical to the corresponding optical receiver circuitry 200 of the remote optical receiver illustrated in FIG. 4 and described above. This circuitry need not be described again here. Unlike the remote optical receiver, however, in the hub optical receiver the data output terminal of the pulse detector 224 is not connected to a diagnostic and test circuit 290 or to a decoder circuit 320. Instead, it is connected directly to the hub LAN circuitry 32 by a DATA OUT line 324. Also, unlike the remote optical receiver, the AGC output of the pulse detector 224 in the optical receiver is connected to the inverting input of a comparator 326 and through a capacitor 328 to GND. The non-inverting input terminal of the comparator 326 is connected to a reference voltage VB2 which is preferably about 2.8 volts and which is suitably derived from the +5V source through a conventional voltage divider (not shown). The output of the comparator 326 is connected by a pull-up resistor 330 to a +5V source and by a carrier detect line 332 to the hub LAN circuitry 32. In the terminology of the Intel 82588 LAN Controller, the carrier detect output is also referred to as the CS output. The carrier detect output 332 is high, indicating the presence of transmitted data only when the AGC output of the disk pulse detector 224 is maintained greater than the reference voltage VB2. This prevents spurious noise signals from being amplified and mistaken as data by the hub LAN circuitry 32.

The optical interface of the invention is conveniently constructed on a conventional printed circuit board or other suitable electrical mounting means which may be mounted in a computer or hub cabinet, for example, by conventional processes. The remote and hub optical interfaces of the invention may be connected, for example, with a dual fiber optic cable and connector such as the ESKA EXTRA 4002 plastic fiber optic cable manufactured by Mitsubishi and the OPTIMATE duplex fiber optic cable connector manufactured by AMP. Other cables such as plastic covered silica (PCS) cable manufactured by Belden, and other connectors may, of course, also be used.

What have been described are various aspects of the presently preferred embodiments of the invention. It is understood that the foregoing detailed description and illustrations are merely exemplary and are in no way intended to limit the scope of the invention, which is defined solely by the appended claims. Various alterations and variations will occur to those skilled in the art. Such variations may include, but are not limited to: variations in timing, protocol, wave shapes, components and values thereof, applications, logic levels, and others. Such variations do not depart from the spirit and scope of the invention. Accordingly, it is intended that all such variations, as well as all equivalents of the invention be covered by the appended claims.

I claim:

1. An optical receiver, comprising:
   light sensitive receiver means for receiving optical signals encoded with digital data comprising a plurality of optical pulses corresponding in time to selected state changes in said digital data and for producing electrical signals having pulses corresponding to said optical pulses;
   peak pulse detector means responsive to the slope of said electrical signals for detecting peaks in said electrical signals and for generating peak detection output signals indicative of the occurrence of individual ones of the peaks of said pulses; and
   means responsive to individual ones of said peak detection output signals for supplying output digital data pulses corresponding in time with each respective one of said peak detection output signals, said output digital data pulses forming a data output of said optical receiver, which data output is indicative of said encoded digital data.

2. The optical receiver defined in claim 1 wherein said optical pulses comprise bipolar alternate mark insertion pulses.

3. The optical receiver defined in claim 2 wherein said digital pulses comprise unipolar pulses corresponding in time to said alternate mark insertion pulses.

4. The optical receiver defined in claim 1, further comprising decoder means for converting said digital pulses into non-return to zero inverted digital data signals.

5. The optical receiver defined in claim 1 wherein said means for detecting peaks comprises a zero-slope detector.

6. The optical receiver defined in claim 5 wherein said zero-slope detector comprises a differentiator.

7. The optical receiver defined in claim 5 wherein said means for detecting peaks further includes means for determining when said electrical signal exceeds a predetermined threshold.

8. The optical receiver defined in claim 7 wherein said means for detecting peaks further includes means responsive to the outputs of both said threshold determining means and said zero-slope detector for generating said digital pulses.

9. The optical receiver defined in claim 8 wherein said means responsive to the outputs of said threshold determining means and said zero-slope detector comprises a flip-flop having a first control input and a second control input, the output of said threshold determining means connected to said first control input, and the output of said zero-slope detector connected to said second control input.

10. An optical interface, comprising:
    an optical transmitter for transmitting optical signals encoded with input digital data comprising a plurality of optical pulses corresponding in time to selected state changes in said input digital data; and an optical receiver comprising:
light sensitive receiver means for receiving said optical signals and producing electrical signals having a plurality of pulses corresponding to said optical pulses;
peak pulse detector means responsive to the slope of said electrical signals for detecting peaks in said electrical signals and for generating peak detection output signals indicative of the occurrence of individual ones of the peaks of said pulses in said electrical signals; and
means responsive to individual ones of said peak detection output signals for supplying output digital data pulses corresponding in time with each respective one of said peak detection output signals, said output digital data pulses forming a data output of said optical receiver, which data output is indicative of said encoded input digital data.

11. The optical interface defined in claim 10 wherein said optical pulses comprise bipolar alternate mark insertion pulses.

12. The optical receiver defined in claim 11 wherein said digital pulses comprise unipolar pulses corresponding in time to said alternate mark insertion pulses.

13. The optical interface defined in claim 10, further comprising decoder means for converting said digital pulses into non-return to zero inverted digital data signals.

14. The optical interface defined in claim 10 wherein said optical transmitter comprises:
means for receiving input digital data signals;
converter means connected to said means for receiving for generating bipolar alternate mark insertion pulses corresponding in time to state transitions of said digital data signals;
optical source means for generating optical signals; and
optical source driving means connected to said converter means and said optical source means for maintaining the output of said optical source means at a reference level comprising a selected percentage of full output and for driving said output between said reference level and a selected higher and a selected lower output level responsive to the states of said pulses to generate alternate mark insertion optical signals.

15. The optical interface defined in claim 14 wherein said digital data signals are non-return to zero inverted signals.

16. The optical transmitter defined in claim 14 wherein said optical source driving means comprises means for smoothing out said optical signals generated by said optical source means thereby reducing the effects of timing jitter on said optical signals.

17. The optical interface defined in claim 10 wherein said peak pulse detector comprises a zero-slope detector.

18. The optical interface defined in claim 17 wherein said peak pulse detector further includes means for determining when said electrical signal exceeds a predetermined threshold.

19. In an optical interface having an optical transmitter for transmitting optical signals encoded with digital data comprising optical pulses corresponding in time to selected state changes of said digital data and an optical receiver for receiving said optical signals, generating electrical signals corresponding thereto, and generating from said electrical signals digital data signals, the improvement comprising:
said optical receiver having peak pulse detector means responsive to the slope of said electrical signals for detecting peaks in said electrical signals corresponding to said optical pulses and for generating peak detection output signals indicative of the occurrence of individual ones of the peaks of said electrical signals corresponding to said optical pulses; and
means responsive to individual ones of said peak detection output signals for supplying output digital data pulses corresponding in time with each respective one of said peak detection output signals, said output digital data pulses forming a data output of said optical receiver, which data output is indicative of said encoded input digital data.

20. The optical interface defined in claim 19 wherein said optical pulses comprise bipolar alternate mark insertion pulses and wherein said digital pulses comprise unipolar digital pulses corresponding in time to said alternate mark insertion pulses.

21. The optical interface defined in claim 20 further comprising decoder means for converting said unipolar digital data signals into non-return to zero inverted digital pulses.

22. The optical interface defined in claim 19 wherein said peak pulse detector comprises a zero-slope detector.

23. The optical interface defined in claim 22 wherein said peak pulse detector further includes means for determining when said electrical signal exceeds a predetermined threshold.

24. In a local area network having a plurality of remote nodes interfaced to at least one central hub by a corresponding plurality of optical interfaces, each of said plurality of optical interfaces comprising an optical transmitter for transmitting optical signals encoded with digital data comprising a plurality of optical pulses corresponding in time to selected state changes in said digital data and an optical receiver for receiving said optical signals, generating electrical signals corresponding thereto, and generating from said electrical signals digital data signals, the improvement comprising:
said optical receiver having peak pulse detector means responsive to the slope of said electrical signals for detecting peaks in said electrical signals corresponding to said optical pulses and for generating peak detection output signals indicative of the occurrence of individual ones of the peaks of said electrical signals corresponding to said optical pulses; and
means responsive to individual ones of said peak detection output signals for supplying output digital data pulses corresponding in time with each respective one of said peak detection output pulses, said output digital data pulses forming a data output of said optical receiver, which data output is indicative of said encoded digital data.

25. The local area network defined in claim 24 wherein said optical pulses comprise alternate mark insertion pulses and wherein said digital pulses comprise unipolar digital pulses corresponding in time to said alternate mark insertion pulses.

26. The local area network defined in claim 25 further comprising decoder means for converting said unipolar digital pulses into non-return to zero inverted digital data signals.

27. The local area network defined in claim 25 wherein said peak pulse detector comprises a zero-slope detector.

28. The local area network defined in claim 27 wherein said peak pulse detector further includes means for determining when said electrical signal exceeds a predetermined threshold.

* * * * *